July 28, 1953     L. W. SIMONS     2,646,618
COMPRESSOR FOR VEHICLE SUSPENSION SPRINGS
Filed Oct. 16, 1948
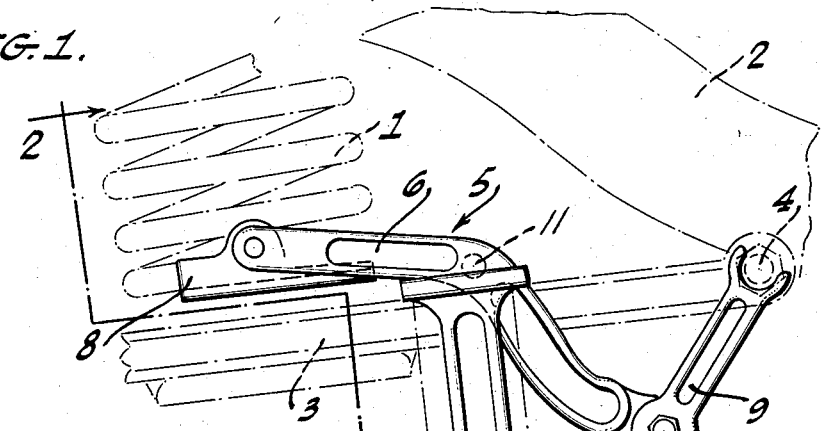
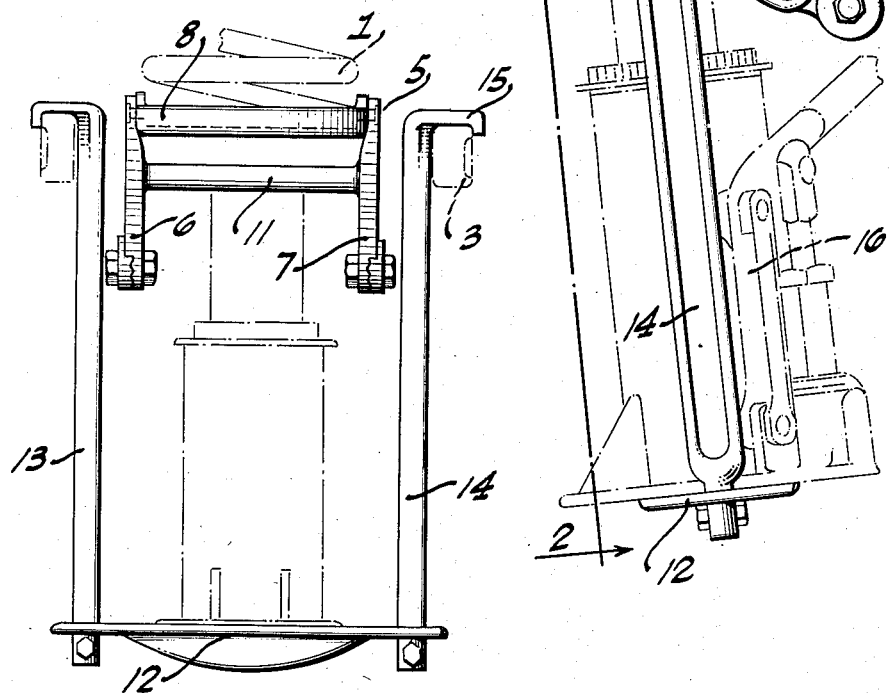
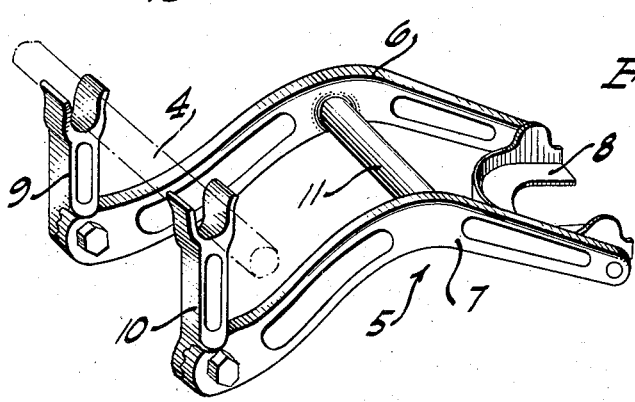
INVENTOR.
LOWELL W. SIMONS,
BY
ATTORNEY.

Patented July 28, 1953

2,646,618

UNITED STATES PATENT OFFICE 2,646,618

COMPRESSOR FOR VEHICLE SUSPENSION SPRINGS

Lowell W. Simons, Long Beach, Calif., assignor of one-half to William N. Deatherage, Long Beach, Calif.

Application October 16, 1948, Serial No. 54,881

1 Claim. (Cl. 29—227)

This invention relates to a means of compressing the suspension springs of a motor vehicle, such as the coil springs, which are used in the front end suspension of automobiles. The purpose of compressing these springs is to introduce shims under the springs when it is necessary to align the front end of an automobile.

An object of my invention is to provide a novel tool for the purpose of compressing the suspension springs of a vehicle, this tool being actuated by a jack.

Another object of my invention is to provide a novel spring compressing tool of the character stated, which can be used in connection with the front wheel suspension structures of a modern automobile.

Another object of my invention is to provide a novel compressing tool of the character stated in which the A frame of the automobile is used to support the tool while compressing the suspension spring.

Another object of my invention is to provide a novel spring compressing tool of the character stated, which is simple in construction and operation, and which can be adapted to all spring suspensions of the modern automobile.

Other objects, advantages and features of invention may appear from the accompanying drawing, the subjoined detailed description, and the appended claim.

In the drawing:

Figure 1 is a rear elevation of my spring compressing tool as shown in operative position.

Figure 2 is a side view of my tool viewed in the direction of line 2—2 of Figure 1.

Figure 3 is a perspective of the compressing frame.

Referring more particularly to the drawing, in the modern automobile a heavy coil spring 1 is mounted between the frame 2, and an A frame 3. This last named frame being pivotedly attached to the frame 2 by a shaft 4. The shaft 4 is journaled in or secured to the frame 2. The spring 1 is suitably seated in both the frame 2 and the A frame 3, all of this is usual and well known in the art.

To compress the spring 1 for the purpose of introducing shims (not shown) under the spring, I provide a compressing frame 5, which consists of a pair of spaced arms 6—7. An open sided tray 8 is pivotedly attached to the outer end of both arms 6—7. The tray 8 is semi-circular in shape so that it can engage a coil of the spring 1, substantially as shown in Figure 1. A pair of fingers 9—10 are bolted to the rear ends of the arms 6—7, respectively, and are adjustable relative to these arms so that the fingers will engage the shaft 4, again as shown in Figure 1. If desired, the fingers 9—10 may be fixedly attached to the arms 6—7, however, I prefer that they be adjustable on the arms.

A transverse shaft 11 extends between the arms 6—7 and is fixedly attached to both these arms. The shaft or rod 11 is provided to afford a means against which a jack can push as will be subsequently described.

A platform 12 is mounted on a pair of links 13—14, which rise from each side of the platform and are suitably fixedly attached to the platform. The upper end of both of the links 13—14 are formed as a hook, shown at 15, and these hooks extend over the sides of the A frame 3, thus hanging or suspending the platform below the A frame. A suitable jack 16 rests on the platform 12 and the piston of the jack bears against the rod 11. This positioning is shown in Figure 1. When the jack 16 is elongated the frame 5 will be pushed upwardly pivotedly around the shaft 4 and causing the tray 8 to raise, thus compressing the spring 1. Suitable shims can now be placed under the spring as may be required to align the front end of the automobile.

Having described my invention, I claim:

A compressing tool for vehicle suspension springs mounted between the vehicle frame, and an A frame comprising a pair of horizontally spaced arms, said arms being curved from end to end thereof, and the high point of the curve being mid-way between the ends of said arms, a finger bolted to one end of each of the arms, each of the fingers being adjustable around said bolt, a fixed rod extending between the arms, said rod being fixedly secured to both of the arms and positioned at the high point of the curve of said arms, an arcuate tray mounted on the outer ends of both of said arms and at the end opposite said fingers, and a pivot pin extending through the arms and into said tray whereby the tray is pivotally attached to the arms, said tray being bifurcated and the ends of said fingers opposite the attachment to said arms being bifurcated.

LOWELL W. SIMONS.

References Cited in the file of this patent

UNITED STATES PATENTS

| Number | Name | Date |
|---|---|---|
| 908,556 | Gaylord | Jan. 5, 1909 |
| 1,006,694 | Slentz | Oct. 24, 1911 |
| 1,139,488 | Christopher | May 18, 1915 |
| 1,199,833 | St. Louis | Oct. 3, 1916 |
| 1,276,692 | Rees | Aug. 20, 1918 |
| 1,397,437 | Martel | Nov. 15, 1921 |
| 1,400,027 | Coddington | Dec. 13, 1921 |
| 1,494,564 | Piasecki | May 20, 1924 |
| 1,575,517 | Albright | Mar. 2, 1926 |
| 1,778,536 | Roberts | Oct. 14, 1930 |
| 1,847,819 | Hirschel | Mar. 1, 1932 |
| 1,978,471 | Mizer et al. | Dec. 30, 1934 |
| 2,142,850 | Johnson | Jan. 3, 1939 |
| 2,467,332 | Monteith | Apr. 12, 1949 |
| 2,495,649 | Wilson | Jan. 24, 1950 |

FOREIGN PATENTS

| Number | Country | Date |
|---|---|---|
| 745,646 | France | Feb. 21, 1933 |